United States Patent
Corey et al.

(10) Patent No.: US 12,407,993 B2
(45) Date of Patent: Sep. 2, 2025

(54) ADAPTIVE BINAURAL FILTERING FOR LISTENING SYSTEM USING REMOTE SIGNAL SOURCES AND ON-EAR MICROPHONES

(71) Applicant: The Board of Trustees of the University of Illinois, Urbana, IL (US)

(72) Inventors: Ryan M. Corey, Glen Ellyn, IL (US); Andrew C. Singer, Mahomet, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 287 days.

(21) Appl. No.: 18/127,518

(22) Filed: Mar. 28, 2023

(65) Prior Publication Data
US 2023/0319492 A1    Oct. 5, 2023

Related U.S. Application Data

(60) Provisional application No. 63/324,983, filed on Mar. 29, 2022.

(51) Int. Cl.
*H04R 25/00*    (2006.01)
*G10K 11/178*   (2006.01)

(52) U.S. Cl.
CPC ..... *H04R 25/558* (2013.01); *G10K 11/17827* (2018.01); *G10K 11/17854* (2018.01);
(Continued)

(58) Field of Classification Search
CPC ........ G10K 11/17827; G10K 11/17854; H04R 3/005; H04R 25/558; H04R 25/554;
(Continued)

(56) References Cited

U.S. PATENT DOCUMENTS 8,675,890 B2    3/2014  Schmidt
9,510,112 B2    11/2016 Petersen
(Continued)

FOREIGN PATENT DOCUMENTS

EP    3312839 A1    4/2018
EP    3333850 A1    6/2018

OTHER PUBLICATIONS

Agnew et al., "Just noticeable and objectionable group delays in digital hearing aids," Journal of the American Academy of Audiology, vol. 11, No. 6, pp. 330-336, 2000.
(Continued)

*Primary Examiner* — Kile O Blair
(74) *Attorney, Agent, or Firm* — Lowenstein Sandler LLP

(57) ABSTRACT

A listening system includes one or more remote signal sources that generate one or more electronic signals, which correspond to sound in an ambient environment. A first ear microphone detects a first combination of audio signals including ambient sound and one or more propagated audio signals, corresponding to the one or more electronic signals, received at a first ear of a listener. The system includes first ear playback device and a processing device to apply a first set of audio filters including an audio filter to process a respective electronic signal of the one or more electronic signals with a first error signal, which is based on an output of the first ear microphone, to generate a first output signal to the first ear playback device, wherein acoustic cue components of the first output signal match corresponding acoustic cue components of the first combination of audio signals.

26 Claims, 8 Drawing Sheets

(52) U.S. Cl.
CPC ............ *H04R 25/43* (2013.01); *H04R 25/453* (2013.01); *H04R 25/505* (2013.01); *H04R 25/552* (2013.01); *H04R 25/554* (2013.01)

(58) Field of Classification Search
CPC .. H04R 25/552; H04R 25/505; H04R 25/453; H04R 25/43; H04R 25/407; H04R 2420/01; H04W 84/18
See application file for complete search history.

(56) References Cited

U.S. PATENT DOCUMENTS

| | | | |
|---|---|---|---|
| 10,164,722 B1* | 12/2018 | Napoles | ................. H04B 1/406 |
| 10,182,160 B2 | 1/2019 | Sorensen | |
| 10,438,605 B1 | 10/2019 | Ganeshkumar | |
| 11,064,302 B2 | 7/2021 | Edwards | |
| 2012/0063610 A1 | 3/2012 | Kaulberg | |
| 2019/0110137 A1 | 4/2019 | Udesen | |
| 2020/0178004 A1 | 6/2020 | Courtois | |

OTHER PUBLICATIONS

Ali et al., "Completing the RTF vector for an MVDR beamformer as applied to a local microphone array and an external microphone," in International Workshop on Acoustic Signal Enhancement (IWAENC), pp. 211-215, 2018.
Ali et al., "Methods of extending a generalized sidelobe canceller with external microphones," IEEE/ACM Transactions on Audio, Speech, and Language Processing, vol. 27, No. 9, pp. 1349-1364, 2019.
Araki et al., "Meeting recognition with asynchronous distributed microphone array using block-wise refinement of mask-based MVDR beamformer," in IEEE International Conference on Acoustics, Speech and Signal Processing (ICASSP), pp. 5694-5698, 2018.
Bertrand et al., "Robust distributed noise reduction in hearing aids with external acoustic sensor nodes," EURASIP Journal on Advances in Signal Processing, vol. 2009, p. 530435, 2009.
Bertrand, A., "Applications and trends in wireless acoustic sensor networks: A signal processing perspective," in IEEE Symposium on Communications and Vehicular Technology in the Benelux (SCVT), pp. 1-6, 2011.
Bogaert et al., "Speech enhancement with multichannel Wiener filter techniques in multimicrophone binaural hearing aids," The Journal of the Acoustical Society of America, vol. 125, No. 1, pp. 360-371, 2009.
Boothroyd, A., "Hearing aid accessories for adults: The remote FM microphone," Ear and Hearing, vol. 25, No. 1, pp. 22-33, 2004.
Corey et al., "Adaptive binaural filtering for a multiple-talker listening system using remote and on-ear microphones," In IEEE Workshop on Applications of Signal Processing to Audio and Acoustics (WASPAA), pp. 1-5, 2021.
Corey et al., "Binaural audio source remixing with microphone array listening devices," in IEEE International Conference on Acoustics, Speech and Signal Processing (ICASSP), pp. 561-565, 2020.
Corey et al., "Motion-tolerant beamforming with deformable microphone arrays," in IEEE Workshop on Applications of Signal Processing to Audio and Acoustics (WASPAA), pp. 115-119, 2019.
Corey, R., "Microphone array processing for augmented listening," Ph.D. thesis, University of Illinois at Urbana-Champaign, 326 pages, 2019.
Cornelis et al., "Theoretical analysis of binaural multimicrophone noise reduction techniques," IEEE Transactions on Audio, Speech, and Language Processing, vol. 18, No. 2, pp. 342-355, 2010.
Doclo et al., "Theoretical analysis of binaural cue preservation using multi-channel Wiener filtering and interaural transfer functions," in International Workshop on Acoustic Echo and Noise Control (IWAENC), 4 pages, 2006.
Farmani et al., "Informed sound source localization using relative transfer functions for hearing aid applications," IEEE/ACM Transactions on Audio, Speech, and Language Processing, vol. 25, No. 3, pp. 611-623, 2017.
Gößling et al., "Performance analysis of the extended binaural MVDR beamformer with partial noise estimation," IEEE/ACM Transactions on Audio, Speech, and Language Processing, vol. 29, pp. 462-476, 2021.
Gößling et al., "Relative transfer function estimation exploiting spatially separated microphones in a diffuse noise field," in International Workshop on Acoustic Signal Enhancement (IWAENC), pp. 146-150, 2018.
Gößling et al., "RTF-based binaural MVDR beamformer exploiting an external microphone in a diffuse noise field," in TG Symposium on Speech Communication, pp. 105-110, 2018.
Gößling et al., "RTF-steered binaural MVDR beamforming incorporating an external microphone for dynamic acoustic scenarios," in IEEE International Conference on Acoustics, Speech and Signal Processing (ICASSP), pp. 416-420, 2019.
Gößling et al., et al., "RTF-steered binaural MVDR beamforming incorporating multiple external microphones," in IEEE Workshop on Applications of Signal Processing to Audio and Acoustics (WASPAA), pp. 373-377, 2019.
Gößling, "Binaural Beamforming Algorithms and Parameter Estimation Methods Exploiting External Microphones," Ph. D. thesis, University of Oldenburg, 182 pages, 2020.
Hadad et al., "The binaural LCMV beamformer and its performance analysis," IEEE Transactions on Audio, Speech and Language Processing, vol. 24, No. 3, pp. 543-558, 2016.
Hadad et al., "Theoretical analysis of binaural transfer function MVDR beamformers with interference cue preservation constraints," IEEE Transactions on Audio, Speech and Language Processing, vol. 23, No. 12, pp. 2449-2464, 2015.
Hunn, N., "Introducing Bluetooth LE Audio," 315 pages, 2022.
Kates et al., "Integrating a remote microphone with hearing-aid processing," The Journal of the Acoustical Society of America, vol. 145, No. 6, pp. 3551-3566, 2019.
Kates, et al., "Externalization of remote microphone signals using a structural binaural model of the head and pinna," The Journal of the Acoustical Society of America, vol. 143, No. 5, pp. 2666-2677, 2018.
Kim et al, "A review of assistive listening device and digital wireless technology for hearing instruments," Korean Journal of Audiology, vol. 18, No. 3, pp. 105, 2014.
Kochkin et al., "Consumer perceptions of the impact of inductively looped venues on the utility of their hearing devices," The Hearing Review, vol. 35, No. 5, pp. 16-26, 2014.
Markovich-Golan et al., "Blind sampling rate offset estimation and compensation in wireless acoustic sensor networks with application to beamforming," in International Workshop on Acoustic Signal Enhancement (IWAENC), 4 pages, 2012.
Marquardt, D., "Development and evaluation of psychoacoustically motivated binaural noise reduction and cue preservation techniques," Ph.D. dissertation, Carl von Ossietzky University of Oldenburg, 202 pages, 2016.
Marquardt, et al., "Interaural coherence preservation in multichannel Wiener filteringbased noise reduction for binaural hearing aids," IEEE Transactions on Audio, Speech and Language Processing, vol. 23, No. 12, pp. 2162-2176, 2015.
Stone et al., "Tolerable hearing aid delays. II. Estimation of limits imposed during speech production," Ear and Hearing, vol. 23, No. 4, pp. 325-338, 2002.
Stone et al., "Tolerable hearing aid delays. V. Estimation of limits for open canal fittings," Ear and hearing, vol. 29, No. 4, pp. 601-617, 2008.
Szurley et al., "Binaural noise cue preservation in a binaural noise reduction system with a remote microphone signal," IEEE/ACM Transactions on Audio, Speech, and Language Processing, vol. 24, No. 5, pp. 952-966, 2016.
Taseska et al., "Informed spatial filtering for sound extraction using distributed microphone arrays," IEEE/ACM Transactions on Audio, Speech, and Language Processing, vol. 22, No. 7, pp. 1195-1207, 2014.

(56) References Cited

OTHER PUBLICATIONS

Thibodeau, L., "Comparison of speech recognition with adaptive digital and FM remote microphone hearing assistance technology by listeners who use hearing aids," American Journal of Audiology, vol. 23, No. 2, pp. 201-210, 2014.
Valimaki et al., "Assisted listening using a headset: Enhancing audio perception in real, augmented, and virtual environments," IEEE Signal Processing Magazine, vol. 32, No. 2, pp. 92-99, 2015.
Wang et al., "Attention-based fusion for bone-conducted and air-conducted speech enhancement in the complex domain," in IEEE International Conference on Acoustics, Speech and Signal Processing (ICASSP), pp. 7757-7761, 2022.
Wolfe et al., "Evaluation of performance with an adaptive digital remote microphone system and a digital remote microphone audio-streaming accessory system," American Journal of Audiology, vol. 24, No. 3, pp. 440-450, Sep. 2015.
Zhu et al., "A robust speech enhancement scheme on the basis of boneconductive microphones," in International Workshop on Signal Design and Its Applications in Communications (IWSDA), pp. 353-355, 2007.
International Search Report and Written Opinion for International Application No. PCT/US2023/016619, mailed Jun. 27, 2023, 11 pages.
International Search Report and Written Opinion for International Application No. PCT/US2023/016614, mailed Jun. 28, 2023, 14 pages.

\* cited by examiner

MIBO – Near mics

MIBO – Far mics

SIBO – Near mics

SIBO – Far mics

ADAPTIVE BINAURAL FILTERING FOR LISTENING SYSTEM USING REMOTE SIGNAL SOURCES AND ON-EAR MICROPHONES

RELATED APPLICATIONS

The present application claims the benefit under 35 U.S.C. § 119(e) of U.S. Provisional Application No. 63/324,983, filed Mar. 29, 2022, which is incorporated herein by this reference.

TECHNICAL FIELD

Embodiments of the disclosure relate generally to listening systems, and more specifically, relate to adaptive binaural filtering for a listening system using remote signal sources and on-ear microphones.

BACKGROUND

Listening devices such as hearing aids and cochlear implants often perform poorly in noisy environments. Remote microphones, which transmit sound directly from a distant talker to the ears of a listener, have been shown to improve intelligibility in adverse environments. The signal from a remote microphone has less noise and reverberation than the signals captured by the earpieces of a listening device, effectively bringing the talker closer.

Although remote microphones can dramatically improve intelligibility, remote microphones often sound artificial. In commercial devices, the signal from the remote microphone is generally presented diotically, e.g., without accounting for delay between the ears. This signal matches the spectral coloration of the remote microphones rather than that of microphones in the earpieces, and lacks interaural time and level differences that humans use to localize sounds. Some modern efforts to resolve these issues are either too processing intensive to be practical and/or employ external microphones that are not sufficiently close to talkers of interest, necessitating beamforming to achieve strong noise reduction. Such systems can be difficult/expensive to implement and are sensitive to motion.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

DETAILED DESCRIPTION

Figure 1:
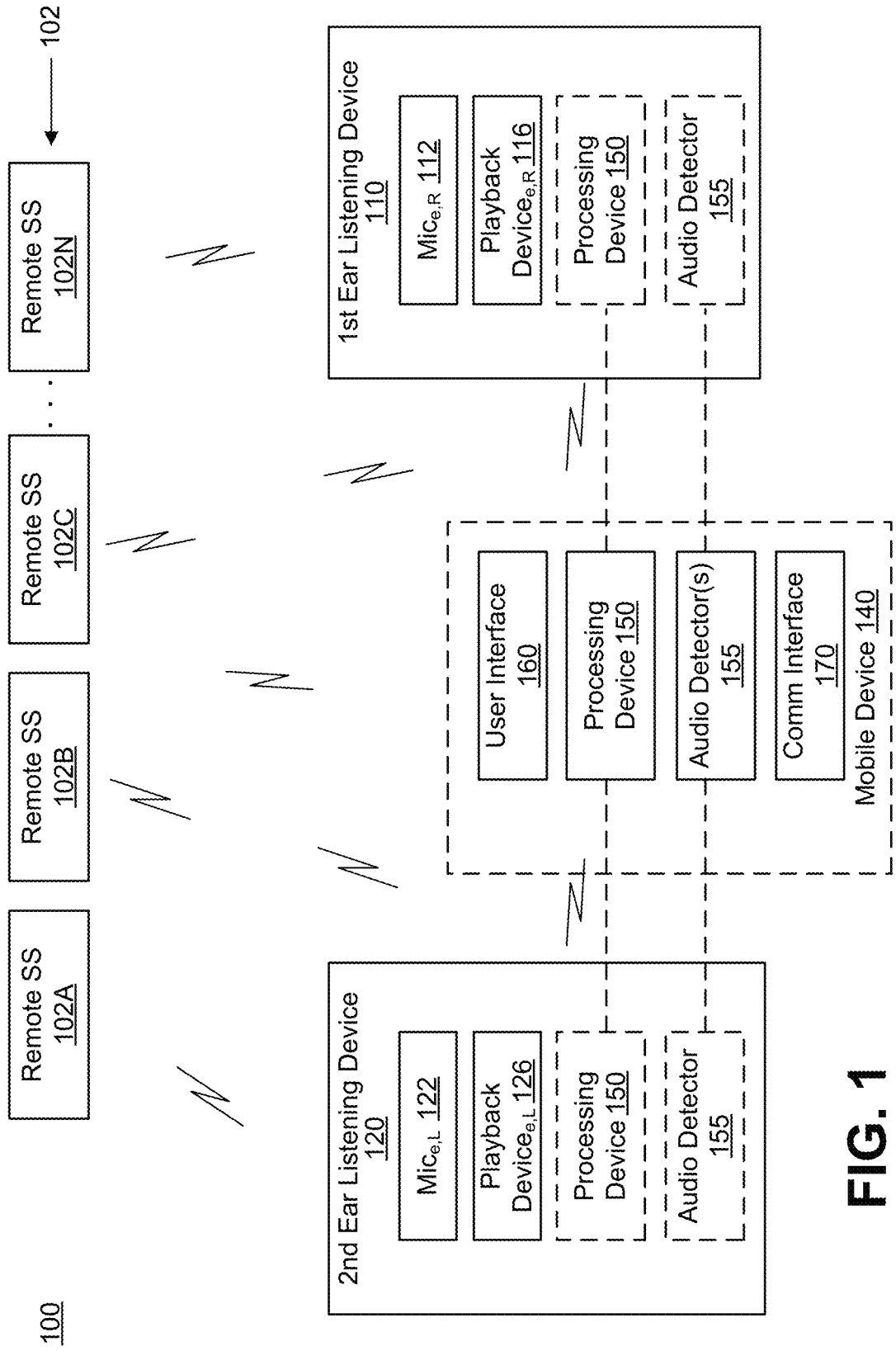
FIG. 1 is a block diagram of a listening system that integrates filtering electronic signals from remote signal sources with locally-captured audio signals, according to an embodiment.

By way of introduction, the present disclosure relates to adaptive binaural filtering for a listening system that uses remote signal sources and on-ear microphones to enhance received sound realism in all kinds of sound environments. Many listening systems or devices can stream sound from external sources such as smartphones, televisions, or wireless microphones placed on a talker. These streamed signals have lower noise than the sound picked up by microphones integrated within earpieces and so are helpful in noisy environments, but they lack spatial cues that help users to tell where sounds are coming from, and they usually only work with one sound source (e.g., one talker) at a time.

Aspects of the present disclosure address the above and other deficiencies by combining one or more remote signal sources that generate one or more electronic signals, which correspond to sound sources in an ambient environment, with a combination of audio signals detected locally by an ear microphone. The combination of audio signals can include, for example, ambient sound and one or more propagated audio signals, which correspond to the same sound sources as the one or more electronic signals but which have propagated though the air acoustically to ears of the listener. A processing device that is coupled to the one or more remote audio sources and to the ear microphone can then apply a set of audio filters to this combination of electronic signals and audio signals. For example, a respective audio filter can process a respective electronic signal of the one or more electronic signals with an error signal, which is based on an output of the ear microphone, to generate an output signal to an ear playback device. In these embodiments, acoustic cue components of the output signal match corresponding acoustic cue components of the combination of audio signals. In this way, the disclosed listening system or device helps the human brain to separate out sounds from different sources, such as two people talking at the same time, and to do so binaurally. Thus, the present disclosure makes it easier for users to hear in group conversations and to do so realistically in a noisy ambient environment.

In various embodiments, the disclosed listening system and devices work by processing the clean signals from the remote signal sources to match the sound captured by ear (or earpiece) microphones of the listening devices. Because the ear microphones are next to the ears, these ear microphones provide useful acoustic cues. The processing device applies an adaptive filter, which can be employed as a set of audio filters, similar to the kind used for echo cancellation, but that enhances the sound instead of canceling the sound. The audio filters are updated as the talkers and listener move. Thus, the current listening system and devices are especially adapted to help listeners hear remote signal sources more accurately and with a more immersive experience, despite being within a noisy environment.

FIG. 1 is a block diagram of a listening system 100 (or listening device) that integrates filtering electronic signals from remote signal sources with locally-captured audio signals, according to an embodiment. According to some embodiments, the listening system 100 includes one or more remote signal sources 102, e.g., as a remote signal source 102A, a remote signal source 102B, a remote signal source 102C, and a remote signal source 102N. The one or more remote signal sources 102, for example, can include one or more microphones (e.g., a remote microphone placed on or near each of multiple talkers), a microphone that is part of a wearable listening device such as headphones, earbuds, a hearing aid, or the like, an array of microphones (e.g., placed near, or focusing on, a group of talkers), one or more audio signal transmitters, one or more broadcast devices, one or more sound systems, or a combination thereof.

A microphone placed on or near each talker, for example, would provide a reliable electronic signal from its wearer (e.g., each participant in a panel discussion), while an array of microphones can be used to enhance all nearby sounds, or to focus on specific sounds of interest, making the array well-suited for dynamic environments where talkers may freely join or leave the conversation within the listening range of the array (e.g., at a small group of people discussing a poster presentation in a large noisy convention center). In some embodiments, the array of microphones is a ceiling mounted array of beamforming microphones designed to pick up on individual talkers that are moving around in certain zones of interest.

In some embodiments, the signal sources 102 include sound-system-generated electronic signals while speakers of the sound system produce corresponding audio signals that arrive at a listener as propagated audio signals. Certain venues such as theaters and churches may employ telecoil induction loops and radio-frequency or infrared broadcasts so that the transmitted signal appears to originate from the sound system of the venue.

In these embodiments, the listening system 100 further includes a pair of listening devices, such as a first ear listening device 110 (also referred to herein as associated with the right ear (or R) for ease of explanation) and a second ear listening device 120 (also referred to herein as the left ear (or L) for ease of explanation). The first ear listening device 110 can further include a first ear microphone 112 and a first ear playback device 116. The first ear microphone 112 can detect a first combination of audio signals including ambient sound and one or more propagated audio signals, corresponding to the one or more electronic signals, received at a first ear of a listener. The second ear listening device 120 can further include a second ear microphone 122 and a second ear playback device 126. The second ear microphone 122 can detect a second combination of audio signals including ambient sound and one or more propagated audio signals, corresponding to the one or more electronic signals, received at a second ear of the listener that is different than the first ear.

In various embodiments, the first and second ear listening devices 110 and 120 are hearing aids, cochlear implants, ear buds, head phones, bone-conduction devices, or other types of in-ear, behind-hear, or over-the-ear listening devices. Thus, the first and second ear playback devices 116 and 126 can each be a receiver (e.g., in a hearing aid or a cochlear implant), a loudspeaker (e.g., of a headphone, headset, earbuds, or the like), or other sound playback device generally delivering sound to the first and/or second ears, either acoustically, via bone-conduction, or other manner of mechanical transduction.

In some alternative embodiments, the reference signals from the first and second ear microphones 112 and 122 can be derived from "virtual microphones" inferred from other physical signals, for example using a linear prediction filter or other means of linear estimation. For example, a multiple-input, binaural-output linear prediction filter could predict the signal at the ears based on signals captured by a microphone array surrounding the head. Such a prediction filter could be derived from prior measurements using on-ear microphones and then applied in the field. This use of virtual microphones is not restricted to "prediction" and may involve a variety of methods of estimating the sound that would appear at a microphone at the ear through measurements from other physical signals.

In various embodiments, the listening system 100 further includes a mobile device 140, which can be any type of mobile processing device such as a mini-computer, a pro-grammed processing device, a smart phone, a mini-tablet, or the like. The mobile device 140 can include a processing device 150, one or more audio detectors 155, a user interface 160, which can be integrated within a graphical user interface displayable on a screen, for example, and a communication interface 170. In some embodiments, the processing device 150 is at least partially located within either of the first ear listening device 110 or the second ear listening device 120, or both. In at least some embodiments, the processing device 150 is coupled to the one or more remote signal sources 102, to the first ear microphone 112, to the first ear playback device 116, to the second ear microphone 122, and to the second ear playback device 126.

In some embodiments, one or more of the audio detectors 155 are located within either of the first ear listening device 110 or the second ear listening device 120, or both, where optional locations are illustrated in dashed lines. In some embodiments, the communication interface 170 is adapted to communicate in multiple personal area network (PAN), Body Area Network (BAN), or local area network (LAN) protocols such as, for example, Bluetooth®, Wi-Fi®, Zigbee®, or the like similar protocol that may be generated in the future that is sufficiently low-latency for electronic audio signal transmission.

In at least some embodiments, the listening system 100 includes a first hearing device containing the first ear microphone 112 and connected to the first ear playback device 116 and a second hearing device containing the second ear microphone 122 and connected to the second ear playback device 126. The processing device 150 can be located within one of the first hearing device, the second hearing device, or the mobile device 140 communicatively coupled to the first hearing device and the second hearing device.

Figure 2:
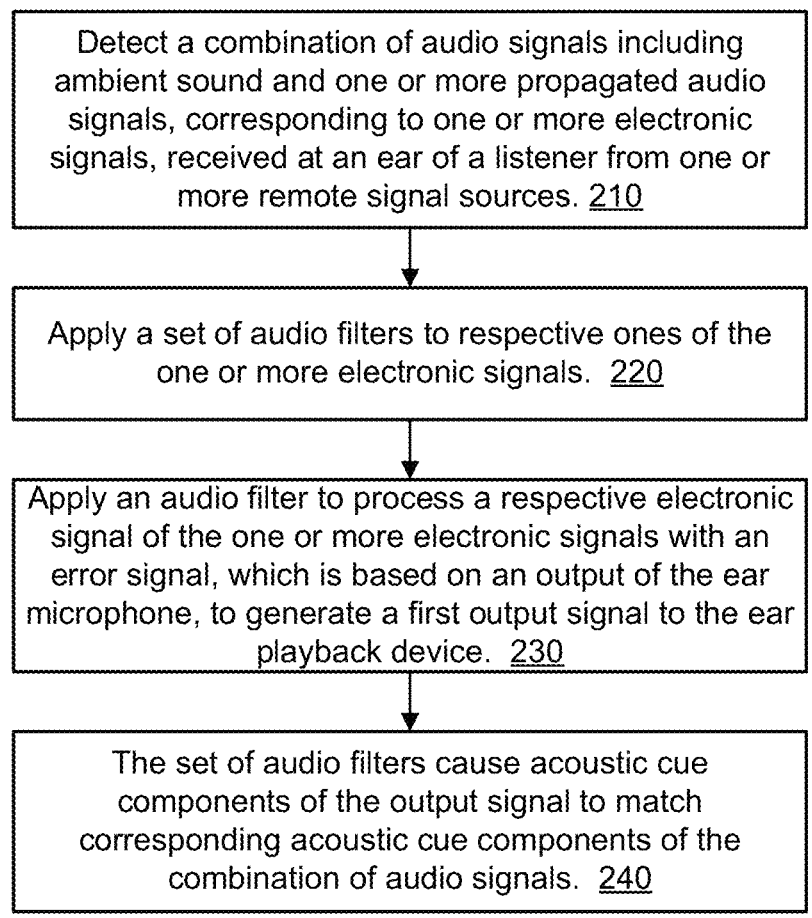
FIG. 2 is a simplified flow chart of a method for filtering the electronic signals with the locally-captured audio signals, according to an embodiment.

FIG. 2 is a simplified flow chart of a method 200 for filtering the electronic signals with the locally-captured audio signals, according to an embodiment. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the processing device 150 of FIG. 1, e.g., in conjunction with other hardware components of the listening system 100 (or device). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic detects a combination of audio signals including ambient sound and one or more propagated audio signals, corresponding to one or more electronic signals, received at an ear of a listener from one or more remote signal sources 102.

At operation 220, the processing logic applies a set of audio filters to respective ones of the one or more electronic signals.

At operation 230, the processing logic applies an audio filter (of the set of audio filters) to a respective electronic signal of the one or more electronic signals with an error signal, which is based on (e.g., a function of) an output of the ear microphone, to generate a first output signal to the ear playback device.

At operation 240, the set of audio filters causes acoustic cue components of the output signal to match corresponding acoustic cue components of the combination of audio signals. Spatial cues are especially helpful with multiple conversation partners, as they help listeners to distinguish signals from different talkers.

With additional reference to FIG. 1, when at least the same number of remote signal sources 102 (such as microphones) as talkers are employed within the listening system 100, the spatial cues of the multiple talkers are best preserved. One advantage of integrating filtering of electronic signals from the remote signal sources 102 and the propagated audio signals detected by the first ear microphone 112 and the second ear microphone 122 is that ambient noise is weakly correlated between the remote signal sources 102 and the local ear microphones. This property has been used to identify the acoustic channel between talkers of interest and the microphones of an array of remote microphones. Here, this correlation property can be exploited to match the magnitude and/or phase of the electronic signals to the propagated audio signals received by the first and second ear microphones 112 and 122.

In various embodiments, as will be explained in more detail with reference to FIGS. 3A-3B, adaptive filters use the electronic signals as inputs and the combined (received) audio signals as references for the desired outputs. If the noise is uncorrelated between the input electronic signals and the reference signals, then the filter matches the cues of the signals of interest. This adaptive approach need not explicitly estimate the acoustic channel or attempt to separate the sources. The present disclosure proposes two variants of adaptive filtering. A first variant can be a set of independently-adapted single-input, binaural-output (SIBO) filters for wearable microphones on spatially separated moving talkers, which will be discussed in more detail with reference to FIG. 3A. The second variant can be a jointly-adapted multiple-input, binaural-output (MIBO) filter suitable for arrays and closely-grouped talkers which will be discussed in more detail with reference to FIG. 3B.

For purposes of explanation, assume there are M of the remote signal sources 102 (which for the present examples are assumed to be remote microphones) placed near N talkers of interest. The reader can assume that the present example can be expanded to different remote signal sources 102 that generate electronic signals and audio signals, e.g., from speakers of a sound system for example or other venue example referred to herein. For purposes of the mathematical formulation, assume that the electronic signals from the remote signal sources 102 are available instantaneously and synchronously to the first and second ear listening devices 110 and 120, for example.

Let $s[t]=[s_1[t], \ldots, s_N[t]]^T$ be the sampled speech signals produced by the talkers of interest. Consider a short time interval during which the talkers, listener, and Text microphones do not move, or whose movement is sufficiently small that its effects can be use ignored. The discrete-time signals $x_e[t] \in \mathbb{R}^2$ received by the first and second ear microphones 112 and 122 and $x_r[t]=[x_{r,1}[t], \ldots, x_{r,M}[t]]^T$ received (or generated) by the remote signal sources 102 are given by $$x_e[t] = \sum_{n=1}^{N}(a_{e,n} * s_n)[t] + z_e[t] \tag{1}$$

$$x_r[t] = \sum_{n=1}^{N}(a_{r,n} * s_n)[t] + z_r[t], \tag{2}$$

where * denotes linear convolution, $a_{e,n}[t] \in \mathbb{R}^2$ and $a_{r,n}[t] \in \mathbb{R}^M$ are equivalent discrete-time acoustic impulse responses: i) between source n and the first and/or second ear microphones 112 and 122; and ii) between source n and the remote signal sources 102, respectively, for n=1, . . . , N. Further, $z_e[t] \in \mathbb{R}^2$ and $z_r[t] \in \mathbb{R}^M$ are additive noise at the first and/or second ear microphones 112 and 122 and the remote signal sources 102, respectively. While the adaptive filters referred to herein are generally described mathematically herein as implemented in the time domain for ease of explanation, these adaptive filters can also be implemented in the time-frequency domain using, e.g., the short-time Fourier transform, a filter bank, or other appropriate filter structure for adaptive acoustic filters.

In various embodiments, the listening system 100 produces a binaural output $y[t] \in \mathbb{R}^2$ given by $$y[t] = \sum_{m=1}^{M}(w_m * x_{r,m})[t], \tag{3}$$

where $w_m[t] \in \mathbb{R}^2$ is a discrete-time binaural filter for inputs m=1, . . . , M. Unlike in a binaural beamformer, the propagated audio signals received at the ears are not inputs to the filter used to generate the output signal to the right and left ear playback devices 116 and 126, e.g., y[t]. However, the propagated audio signals could be mixed with y[t] if desired to improve spatial awareness of ambient noise, as will be further discussed.

In at least some embodiments, the listening system 100 is designed to be perceptually transparent so that the binaural output approximates the signal captured by the first and/or second ear microphones 112 and 122 but with less noise. Mathematically, the desired output $d[t] \in \mathbb{R}^2$ can be given by $$d[t] = \sum_{n=1}^{N}(g_n * a_{e,n} * s_n)[t], \tag{4}$$

where $g_n[t] \in \mathbb{R}$ is the desired processing to be applied to each source n. The $g_n$'s can be used to apply different amplification and spectral shaping to each source, for example based on distance. The binaural impulse responses $a_{e,n}$ encode the effects of room acoustics on the spectrum of each speech signal as well as the interaural time and level differences used to localize sounds.

It may convenient to analyze the filters in the frequency domain. Let $W(\omega) \in \mathbb{C}^{2 \times M}$, $A_e(\omega) \in \mathbb{C}^{2 \times N}$, $A_r(\omega) \in \mathbb{C}^{M \times N}$ and $G(\omega) \in \mathbb{C}^{N \times N}$ be the discrete-time Fourier transforms of their respective impulse responses, where G is a diagonal matrix of desired responses for the N sources. To preserve the spectral and spatial cues of the N distinct Us sources, the filter should satisfy $$W(\omega)A_r(\omega) = A_e(\omega)G(\omega). \quad (5)$$

For arbitrary $A_r$, the filter can meet this condition if M≥N, that is, there are at least as many remote signal sources as talkers.

Adaptive filters are often designed to minimize a mean square error (MSE) between the output and desired signals. If the speech sources and noise were wide-sense stationary random processes with known second-order statistics and if the acoustic impulse responses were known, one could directly minimize the MSE loss $$MSE[t] = \mathbb{E}[|y[t] - d[t]|^2] \quad (6)$$

where $\mathbb{E}$ denotes statistical expectation.

In various embodiments, if the filters are allowed to be non-causal and to have infinite length, then the linear minimum-mean-square-error (MMSE) filter can be readily computed in the frequency domain. Assume that all signals have zero mean and that the speech signals are uncorrelated with the noise signals. Let $R_s(\omega) \in \mathbb{C}^{N \times N}$, $R_{z_e}(\omega) \in \mathbb{E}^{2 \times 2}$ and $R_{z_r}(\omega) \in \mathbb{C}^{M \times M}$ be the power spectral density matrices for $s[t]$, $z_e[t]$, and $z_r[t]$, respectively, and let $R_{z_e z_r}(\omega) \in \mathbb{C}^{2 \times M}$ be the cross-power spectral density between $z_e[t]$ and $z_r[t]$. Then the MMSE filter is given by $$W_{MMSE}(\omega) = A_e(\omega) G(\omega) R_s(\omega) A_r^H(\omega) \cdot [A_r(\omega) R_s(\omega) A_r^H(\omega) + R_{z_r}(\omega)]^{-1}. \quad (7)$$

If $A_r$ has full column rank, then the Woodbury identity can be used to show that the MMSE filter satisfies Equation (5) in the high-signal-to-noise-ratio (SNR) limit. In the remainder of the disclosure, the frequency variable ω is omitted for brevity.

The MMSE filter relies on the signal statistics and the transfer functions between the remote signal sources 102 and the first and second ear microphones 112 and 122, which can be difficult to estimate. Fortunately, when remote microphones are close to the sources, they provide high-quality reference signals that eliminate the need for complex source separation algorithms. Ambient noise signals are often mostly uncorrelated between on-ear and remote microphones. The processing device 150 may use this property to efficiently estimate the relative transfer function between the remote signal sources 102 and the first and second ear microphones 112 and 122 using the noisy mixture. This same principle can be applied to the adaptive filtering problem, replacing the desired signal d[t] with the noisy propagated audio signal received at the ear microphone(s), as will be discussed in more detail with reference to FIGS. 3A-3B.

In various embodiments, the above adaptive filter formulation automatically time-aligns the signals, e.g., adds delays to the remote electronic signals, which travel faster than sound. Further, the adaptive filter formulation matches the magnitude and/or phase between the remote electronic signals and the propagated audio signals that arrive at the speed of sound through the air at the ears of the listener. These features help to prevent echoes and distortion.

Further, in at least some embodiments, a listener is enabled access to tuning options via the user interface 160. For example, the user interface 160 can display a number of menu selection items, from which the listener can choose to, e.g., listen only to the remote signal sources (e.g., distant talkers), or choose to hear everything in the environment for situational awareness.

Figure 3A:
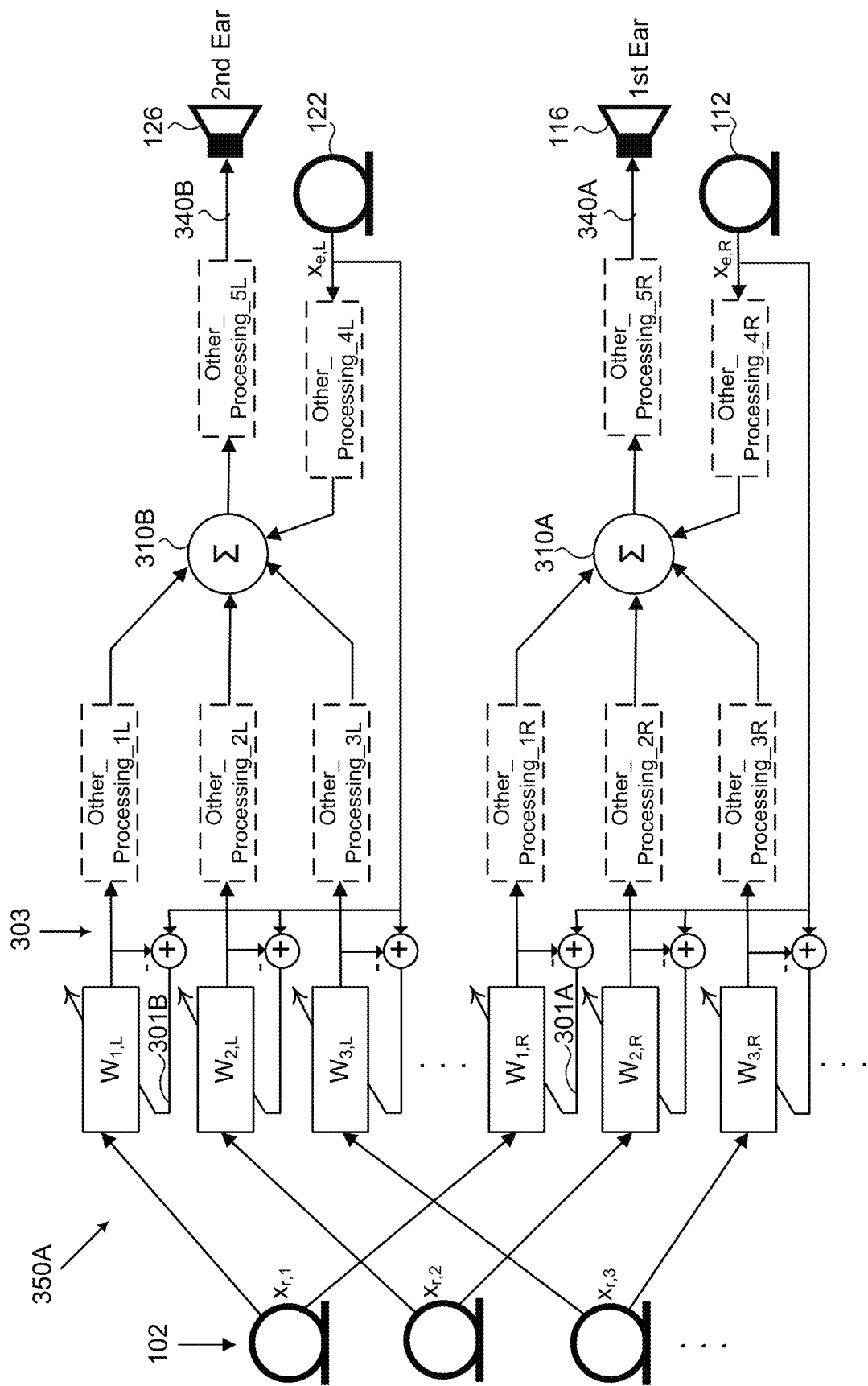
FIG. 3A is a block diagram of an example set of single-input, binaural-output (SIBO) audio filters to perform adaptive filtration on multiple electronic signals from remote signal sources according to an embodiment.

FIG. 3A is a block diagram of example single-input, binaural-output (SIBO) audio filters 350A to perform adaptive filtration on multiple electronic signals from the remote signal sources 102 according to an embodiment. The SIBO audio filters 350A are labeled $W_{m,R}$ for a first set audio filters for the right ear and $W_{m,L}$ for a second set of audio filter for the left ear. Each SIBO audio filter can process a separate incoming remote electronic signal (coming from the one or more remote signal sources 102) together with an error signal that is fed back as reference from an output ($x_{e,R}$ or $x_{e,L}$) of the first or second ear microphone 112 or 122, respectively. The adaptive filtering of FIG. 3A can be best suited restricting the listening system 300 to only certain talkers or to apply different amplification to different talkers, or if remote microphones move so that coherent combining is difficult. In these situations, where tracking individual talkers, a remote microphone can be placed on or near each individual talker as the remote signal sources 102.

More specifically, in some embodiments, the processing device 150 applies a first set of audio filters ($W_{m,R}$) including an audio filter (e.g., $W_{1,R}$) to process a respective electronic signal of the one or more electronic signals with a first error signal 301A, which is based on an output ($x_{e,R}$) of the first ear microphone 112, to generate a first output signal 340A to the first ear playback device 116. In some embodiments, acoustic cue components of the first output signal 340A match corresponding acoustic cue components of the first combination of audio signals received by the first ear microphone 112. In at least some embodiments, the processing device 150 further applies a second set of audio filters ($W_{m,L}$) including an audio filter (e.g., $W_{1,L}$) to process a respective electronic signal of the one or more electronic signals with a second error signal 301B, which is based on an output ($x_{e,L}$) of the second ear microphone 122, to generate a second output signal 340B to the second ear playback device 126. In some embodiments, acoustic cue components of the second output signal 340B match corresponding acoustic cue components of the second combination of audio signals received by the second ear microphone 122.

Each filter $w_m$ is designed to reproduce the speech of talker m, so that $(w_m * x_{r,m})[t] \approx (g_m * a_{e,m} * s_m)[t]$ for $m = 1, \ldots, M = N$, and the symbol ≈ denotes "approximately equal". Each filter is computed separately to minimize its own loss function $$\mathcal{L}_m[t] = \mathbb{E}[|w_m * x_{r,m}[t] - (g_m * x_e)[t]|^2]. \quad (8)$$

The solution is given in the frequency domain by the 2×1 filter $$W_m = G_m[A_e R_s A_{r,m}^H + R_{z_e z_{r,m}}][A_{r,m} R_s A_{r,m}^H + R_{z_{r,m}}]^{-1}, \quad (9)$$

where $A_{r,m}$ is the row of $A_r$ corresponding to microphone m. If the speech sources are uncorrelated, then the SIBO filter can be expressed as $$W_m = G_m \frac{A_{e,1} R_{s_1} A_{r,m,1}^* + \ldots + A_{e,M} R_{s_M} A_{r,m,M}^* + R_{z_e z_{r,m}}}{|A_{r,m,1}|^2 R_{s_1} + \ldots + |A_{r,m,M}|^2 R_{s_M} + R_{z_{r,m}}} \quad (10)$$

It can be seen from Equation (10) that the interaural cues are distorted by crosstalk among the remote microphones as well as by correlated noise. Crosstalk can also produce unintended interference effects, such as comb-filtering distortion, when the SIBO filter outputs are summed. Thus, in some embodiments, a cross-talk filter can be added into some of the post-processing discussed below.

In some embodiments, intermediate outputs 303 of the audio filters are optionally further processed, e.g., by other_processing_1L, other_processing_2L, and other_processing_3L for each of the illustrated three audio filters of the first set of audio filters or other_processing_1R, other_processing_2R, or other_processing_3R for each of the three audio filters of the second set of audio filters. In these embodiments, each of these "other_processing" blocks include the same or different signal processing, e.g., such as frequency-selective gain, feedback suppression, noise reduction, and dynamic range compression. For example, dynamic range compression could operate independently on each of the intermediate outputs 303, which may prevent certain types of distortion.

In at least some embodiments, the one or more electronic signals include multiple electronic signals, each audio filter of the first set of audio filters is to generate an intermediate output signal corresponding to a respective electronic signal, and the processing device 150 further combines (e.g., at a first summer 310A) the intermediate output signals to generate the first output signal 340A. In at least some embodiments, each audio filter of the second set of audio filters is to generate an intermediate output signal corresponding to a respective electronic signal, and the processing device 150 further combines (e.g., at a second summer 310B) the intermediate output signals to generate the second output signal 340B.

In additional embodiments, the processing device imparts additional processing before the output signals 340A and 340B are generated. More specifically, in some embodiments, the processing device 150 processes (e.g., with other_processing_4R) the output ($x_{e,R}$) of the first ear microphone 112 to generate a first processed microphone signal and mixes, into the first output signal 340A, the first processed microphone signal. Further, in these embodiments, the processing device 150 processes (e.g., with other_processing_4L) the output ($x_{e,L}$) of the second ear microphone 122 to generate a second processed microphone signal and mixes, into the second output signal 340B, the second processed microphone signal. The mixing can occur at the first and second summers 310A and 310B, respectively. Further, the processing device 150 can control the relative levels of the live audios signals from the first and/or second ear microphones 112 and 122 compared to the processed audio signals e.g., for a selected trade-off between signal-to-noise ratio improvement and environmental awareness. This type of mixing can also reduce distortion of binaural cues for non-target sound sources.

In some embodiments, the processing device 150 further processes the first combination of the intermediate output signals with post-processing (e.g., other_processing_5R) that corresponds to an audio parameter before generating the first output signal 340A. In some embodiments, the processing device 150 further processes the second combination of the intermediate output signals with post-processing (e.g., other_processing_5L) that corresponds to the audio parameter before generating the second output signal 340B. In some embodiments, the processing device receives, via the user interface 160, a menu selection to adjust the audio parameter, and adjusts the audio parameter of the post-processing according to the menu selection. The audio parameter can include, for example, different volume levels at respective ear playback devices 116 and 126, different volume levels imparted to the electronic signals from the one or more signal sources 102 compared to the volume level of the propagated audio signals received at the first and second ear microphones 112 and 122 and the like.

In at least some embodiments, instead of enhancing signals of interest, the listening system 100 could be used to remove unwanted sound source signals. The output of one or more of the set of audio filters can be subtracted from the live sound captured by the first and/or second ear microphones 112 and 122. Such a system could, for example, reduce the level of music audio (or other public-address sounds) in a public venue using a copy of the audio signal of the music transmitted by the sound system. The unwanted sound signal could also be deliberately introduced in order to protect the privacy of a conversation between users of the system, either as music, white-noise, or other background noise.

In at least some embodiments, the first set of audio filters ($W_{m,R}$) and the second set of audio filters ($W_{m,L}$) are defined by a parametric model that is to separately, for each of the remote signal sources 102A . . . 102N, at least one of apply an equalization filter that is shared by both the first output signal and the second output signal or encode interaural time and amplitude level differences between the first output signal and the second output signal used to localize sounds.

In at least some embodiments, the first set of audio filters ($W_{m,R}$) is defined by a parametric model that is to separately, for each of the remote signal sources 102A . . . 102N, at least one of: encode a delay time for the first output signal; perform parametric equalization for the first output signal; encode a set of effects of ambient acoustics on a spectrum of the one or more electronic signals; define a filter that has an impulse response of a particular length; or define a filter described by a set of poles and zeros. The parametric model can also be applied to the second set of audio filters ($W_{m,L}$).

In at least some embodiments, by way of example, the first error signal 301A includes a difference between the output of the first audio filter ($W_{1,R}$) and the output ($x_{e,R}$) of the first ear microphone 112. In these embodiments, the processing device 150 is further to input a first electronic audio signal, from a first remote signal source (e.g., $x_{r,1}$), to the first audio filter. The processing device 150 may cause a first relative transfer function of the first audio filter to adaptively minimize the first error signal in a first intermediate output signal, where it is understood that the mean-square value of the error or a variety of other functions of the error are to be minimized. The processing device 150 can input a second electronic signal, from a second remote signal source (e.g., $x_{r,1}$), to a second audio filter ($W_{2,R}$) of the first set of audio filters. The second error signal includes a difference between the output of the second audio filter ($W_{2,R}$) and the output ($x_{e,R}$) of the first ear microphone 112. The processing device 150 may then cause a second relative transfer function of the second audio filter ($W_{2,R}$) to minimize the MMSE in the second error signal in a second intermediate output signal, and combine, to generate the first output signal 340A, the first intermediate output signal with the second intermediate output signal, where it is understood that the mean-square value of the error or other function of the error can be minimized. These operations can be extended to additional ones of the remote signal sources 102.

In some embodiments, the processing device 150 further applies a first processing variation to the first intermediate output signal (e.g., other_processing_1R) and applies a second processing variation (e.g., other_processing_2R) to the second intermediate output signal. With additional reference to FIG. 1, in some embodiments, a first audio detector (of the one or more audio detectors 155) is coupled to the processing device 150, which disables the first audio filter ($W_{1,R}$) in response to sound from the first remote signal source not satisfying a threshold magnitude. Further, in these embodiments, a second audio detector (of the one or more audio detectors 155) is coupled to the processing device 150, which disables the second audio filter ($W_{2,R}$) in response to sound from the second remote signal source not satisfying the threshold magnitude. To satisfy the threshold magnitude is to be greater than or at least equal to the threshold magnitude. This threshold magnitude may be set within a certain audio range that statistically determines that the remote signal source is not active, e.g., the remote talker is not talking or not talking sufficiently loud into a remote microphone. In this way, disabling each respective audio filter that is coupled with a particular remote signal source 102 that is inactive helps to improve the performance of that filter and to conserve processing power needed by the processing device 150.

In various embodiments, the audio detector 155 of the first ear listening device 110 and/or the second ear listening device 120, in conjunction with a corresponding microphone or some speech detecting hardware, operates as a voice activity detector of each of the remote signal sources 102. Voice activity detection (or VAD) is a technique in which presence or absence of human speech is detected. Although VAD is commonly performed using logic coupled to a microphone, VAD may also be employed in conjunction with an accelerometer (such as present in AirPods®) or a vibration detection device attached to the throat area of a user. Thus, a VAD device may be employed as a part of an intelligent or smart audio detection device or system, which can be embedded within any single device or a combination of the first ear listening device 110, the second ear listening device 120, and/or the mobile device 140.

In embodiments, VAD is used to trigger one or more processes performed by the processing device 150. VAD can be applied in speech-controlled applications and devices like smartphones (among other smart devices that are employed homes, offices, and vehicles), which can be operated by using speech commands. Further, some of the main uses of VAD are in speaker diarization, speech coding, and speech recognition. VAD can facilitate speech processing and be used to deactivate some processes during non-speech section of an audio session or during a speech section of the audio session, depending on the processing.

In these embodiments, the processing device 150 is configured to mute any remote signal source 102 (e.g., smart phone) in response to the sound detected by the VAD of that remote signal source not satisfying the threshold magnitude (e.g., which may be indicative of the corresponding talker not speaking). Thus, in these embodiments, the "disabling" of a remote signal source 102 may include muting (or not accepting audio from) that remote signal source 102. In various embodiments, the processing device 150 is also configured to pause adaption of the disclosed adaptive filters without muting the remote signal source 102. This strategy prevents cutting off the start of an utterance and avoids sudden changes in the sound presented to the listener.

Figure 3B:
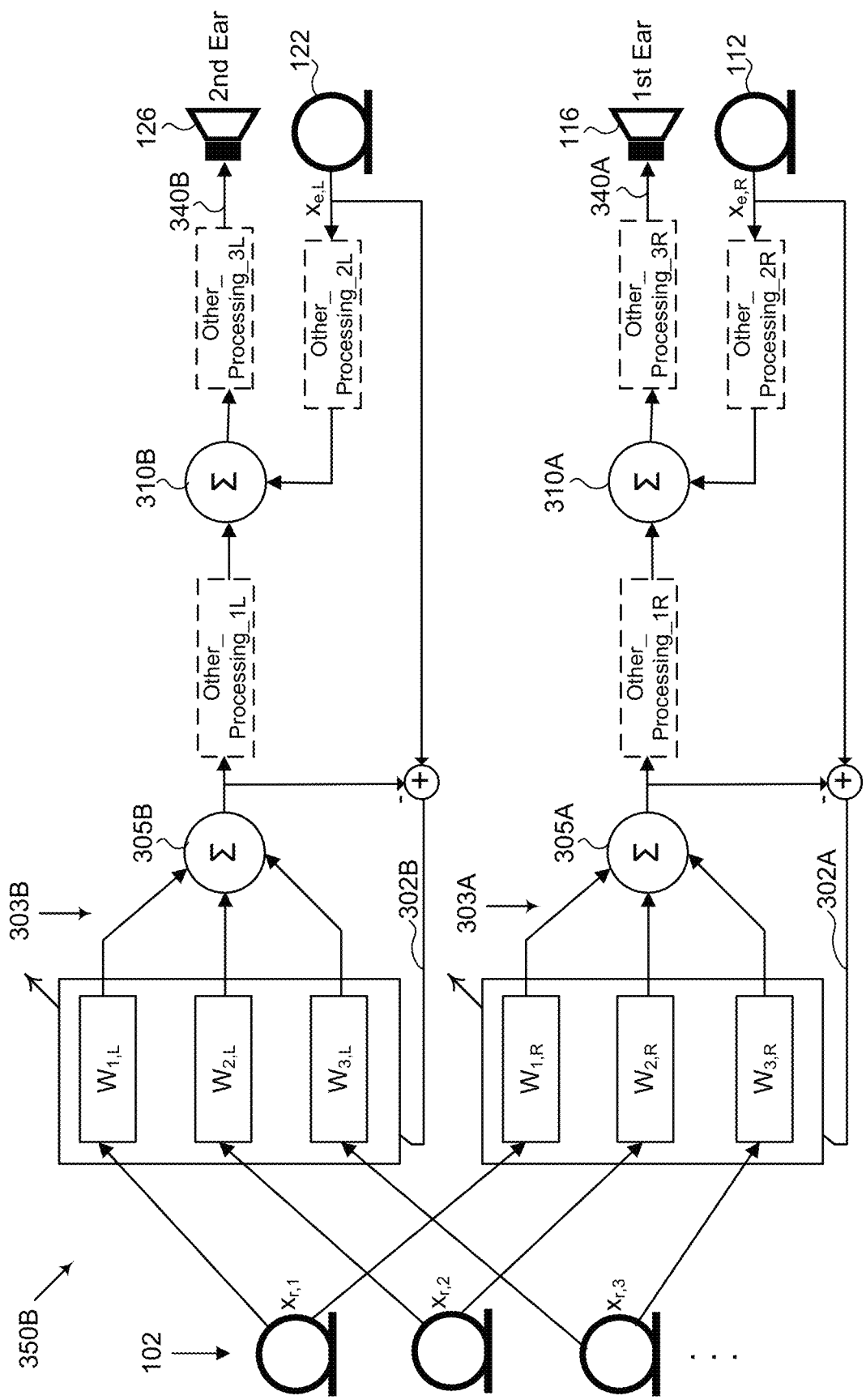
FIG. 3B is a block diagram of example set of multi-input, binaural-output (MIBO) audio filters to perform adaptive filtration on multiple electronic signals from remote signal sources according to an embodiment.

FIG. 3B is a block diagram of an example set of multi-input, binaural-output (MIBO) audio filters 350B to perform adaptive filtration on multiple electronic signals from remote signal sources according to an embodiment. As discussed, the MIBO audio filters 350B may be especially suited for arrays of remote signal sources 102 (e.g., microphone array, speaker array, or the like) and closely-grouped talkers that may come and go within an area of interest to which a microphone array is pointing.

In at least some embodiments, the MIBO audio filters 350B are similarly labeled $W_{m,R}$ for the first set of audio filters for the right ear and $W_{m,L}$ for the second set of audio filters for the left ear, and thus have similarities to the SIBO audio filters 350A. Different from the SIBO audio filter embodiment (FIG. 3A), however, the first set of audio filters ($W_{m,R}$) jointly process the one or more remote electronic signals with a single first feedback signal 302A received from the first ear microphone 112 to generate first intermediate output signals 303A. The processing device 150 may combine (e.g., using a summer 305A) the first intermediate output signals 303A to generate the first output signal 340A. Further, the second set of audio filters ($W_{m,L}$) jointly process the one or more remote electronic signals with a single second feedback signal 302B received from the second ear microphone 122 to generate second intermediate output signals 303B. The processing device 150 may combine (e.g., using a summer 305B) the second intermediate output signals 303B to generate the second output signal 340B.

In some embodiments, the first error signal 301A includes a difference between a combination of the first intermediate output signals 303A and the output ($x_{e,R}$) of the first ear microphone 112, and a single acoustic loss function of the first set of audio filters is to adaptively minimize the mean-square value of the first error signal, where it is understood that the mean-square value or other function of the error can be minimized. In some embodiments, the second error signal 301B includes a difference between a combination of the second intermediate output signals 303B and the output ($x_{e,L}$) of the second ear microphone 122, and a single acoustic loss function of the second set of audio filters is to adaptively minimize the mean-square value of the second error signal, where it is understood that the mean-square value or other function of the error can be minimized.

To discuss the MIBO audio filters 350B mathematically, suppose that a desired response is the same for all talkers, that is, $g_n[t]=g[t]$ for all n and $G(\omega)=G(\omega)I$ for all $\omega$. Instead of minimizing the true MSE, the processing device 150 can minimize the loss function $$\mathcal{L}_{[t]} = \mathbb{E}\left[|y[t] - (g^* x_e)[t]|^2\right]. \tag{11}$$

In some embodiments, if the signals are wide-sense stationary, then the linear MMSE filter that minimizes $\mathcal{L}$ is given in the frequency domain by $$W_{MIBO} = G[A_e R_s A_r^H + R_{z_e z_r}][A_r R_s A_r^H + R_{z_r}]^{-1}. \tag{12}$$

This MIBO audio filter attempts to replicate both the desired speech and the unwanted noise at the ears, e.g., as delivered within the output signals 340A and 340B. However, if the noise is uncorrelated between the combined propagated audio signals and remote electronic signals, then $R_{z_e z_r}(\omega)=0$ and the adaptive filter of Equation (12) is identical to the MMSE filter of Equation (7). That is, the MIBO audio filter cannot use the remote electronic signals to predict the noise, only propagated audio of the talkers (or other signal sources) of interest.

With correlated noise, the spatial cues of the target are distorted by those of the noise, as can be readily seen in the special case where M=N=1:

$$W_{MIBO} A_r = G \frac{A_e |A_r|^2 R_s + R_{z_e z_r} A_r}{|A_r|^2 R_s + R_{z_r}}. \tag{13}$$

In the numerator of Equation (13), the noise at the remote electronic signals distorts interaural cues to the extent that it is correlated with the noise at the remote microphone (or other signal source). In the denominator of Equation (13), the magnitude of the noise at the remote microphone alters the magnitude of the output, just as it would for the MMSE filter. Thus, system performance may strongly depend on placement of the remote microphone relative to the remote speakers.

In some embodiments, a property of the MIBO audio filters 350B is that the combined adaptive filter processing does not separate the sources of interest, nor does each MIBO audio filter 350B explicitly model their acoustic transfer functions. Since the inputs to each MIBO audio filter 350B can be combinations of the speech signals of interest, the MIBO audio filter 350B is suitable for systems with significant crosstalk, such as wearable microphones on nearby talkers or a microphone array placed near a group of talkers. It can also adapt easily as talkers move around the area near the microphones or as they enter and leave a conversation, where preferably no more than M talkers participate at a time.

In additional embodiments, the processing device imparts additional processing before the output signals 340A and 340B are generated. In at least some embodiments, the processing device 150 further optionally processes (e.g., with other_processing_1R) the combination of the first intermediate output signals 303A to generate the first output signal 340A. Further the processing device 150 optionally processes (e.g., with other_processing_1L) the combination of the second intermediate output signals 303B to generate the second output signal 340B.

In at least some embodiments, the processing device 150 optionally processes (e.g., with other_processing_2R) the output ($x_{e,R}$) of the first ear microphone 112 to generate a first processed microphone signal. The processing device 150 can further mix (e.g., via a first summer 310A) the first processed microphone signal into the first output signal 340A. Further, in these embodiments, the processing device 150 optionally processes (e.g., with other_processing_2L) the output ($x_{e,L}$) of the second ear microphone 122 to generate a second processed microphone signal. The processing device 150 can further mix (e.g., via a second summer 310B) the second processed microphone signal into the second output signal 340B.

In at least some embodiments, the processing device 150 further optionally processes (e.g., with other_processing_3R) the first output signal 340A before outputting the first output signal 340A to the first ear playback device 116. In these embodiments, the processing device 150 further optionally processes (e.g., with other_processing_3L) the second output signal 340B before outputting the second output signal 340B to the second ear playback device 126. In some embodiments, the processing device 150 can apply the various further processing (e.g., designated as "other_processing" herein) separately or in combination, as related to either of the SIBO audio filters 350A (FIG. 3A) or the MIBO audio filter 350B (FIG. 3B).

In some embodiments, if the processing device 150 is unsuccessful with source separation of the remote signal sources 102 within a SIBO mode of applying the SIBO audio filters 350A for each ear (FIG. 3A), the processing device 150 switches to a MIBO mode of applying the MIBO audio filter 350B for each ear (FIG. 3B). While the adaptive filtration of the SIBO audio filters 350A and the MIBO audio filter 350B, respectively, are explained above to use the least mean squares algorithm, in other embodiments, a different adaptive algorithm is employed, such as recursive least squares or normalized least mean squares, or others that are known in the field of adaptive filtering. The samples of the audio signals could be processed in blocks, and the learning rate can also be changed over time. Thus, the listening system 100 does not depend on the specific adaptive algorithm used.

In some embodiments, instead of an arbitrary audio filter or a specific parametric model, the adaptive filtering of an applied set of audio filters could choose the filter that best matches the observed (e.g., processed) audio from a set of possible audio filters. This set of possible audio filters could include, for example, a database of generic human head-related impulse responses, like those used for virtual-reality audio; a database of personalized head-related impulse responses for the listener user, which have been measured directly or inferred based upon the head shape of the listener user; a database of head-related impulse responses augmented by interpolation techniques; a manifold of head-related impulse responses generated by a manifold learning algorithm. These databases/manifolds could be refined based upon room acoustics of the ambient environment. For example, the system could select from one set in a strongly reverberant room and another set in a weakly reverberant room.

In some embodiments, one or more audio filter(s) applied by the processing device 150 is initialized (and occasionally re-initialized) using either a parametric filter model or a filter chosen from a database or manifold. The chosen filter can then be fine-tuned using the adaptive filtering algorithm such as those discussed herein.

In some embodiments, one or more audio filter(s) applied by the processing device 150 is constrained based on a physical or perceptual model. For example, the adaptive algorithm could impose upper and lower bounds on the magnitude of the frequency response within different bands or the variation of the magnitude across bands. The audio filters at the two ears can also be constrained so that they do not deviate from each other by more than the expected delay or attenuation due to the head of a listener.

In some embodiments, the adaptation of the one or more audio filter(s) is aided by position information from a head-tracking system or other motion-capture devices. For example, a head-related impulse response can be selected based not only on the audio data, but also on the direction of the talker relative to the head orientation of the listener user.

In some embodiments, the listening system 100 can improve the quality of the first and second output signals 340A and 340B (FIGS. 3A-3B) in a reverberant environment by the processing device 150 performing reverberation-reducing processing such as truncating the impulse response (or the part of the impulse response following the direct path) to a prescribed length in order to reduce reverberation. When selecting filters from a database or manifold, the processing device 150 can further choose equivalent filters that share the same spatial cues as the propagated audio signal received at the first and/or second ear microphones 112 and 122, but have milder reverberation. The processing device can further adjust gain and reverberation levels based on the distance from the talker to the listener user. The distance can be inferred from the acoustic time of flight of the signal or measured directly using range-finding technology built into the processing device 150. The processing device 150 can further switch off the binaural filter when the talker is far away. Beyond a prescribed distance, the listening system 100 would function like a conventional remote microphone and present the remote signal diotically.

People with hearing loss often have difficulty hearing people who are not facing them. If the processing device 150 detects that the talker is facing away from the listener, for example based on the slope of the magnitude response of the acoustic transfer function, the processing device 150 can substitute a head-related impulse response for a remote signal source 102 in the same location, but facing toward the listener.

In some embodiments, the listener user could use a control interface displayed within the user interface 160 (e.g., that includes physical knobs, a smartphone app, voice commands, gestures, and the like) to adjust the relative levels of different sounds. The options could include the individual sounds corresponding to remote microphones, the live mixture at the ears, and external signals such as playback from a personal electronic device. In some embodiments, sound levels could be adjusted relative to the magnitude level at the ears, rather than the magnitude level at the source or some absolute measure of sound pressure level. For example, the user could make a conversation partner "twice as loud as real life" or annoying music "half as loud as real life." The listener user could also directly change reverberation levels of each source, or choose upper or lower bounds on acceptable reverberation levels. To provide a more intuitive user experience, instead of providing separate controls for gain and reverberation, the control interface could allow the listener user to change the perceived distance of the remote signal source 102. If the listener user wishes to "move the sound closer," the processing device 150 can increase gain and decrease reverberation by a corresponding amount, for example.

With additional reference to FIG. 1, and in at least one embodiment, the one or more remote signal sources 102 include one or more remote microphones that detect one or more local audio signals and transmit one or more electronic signals corresponding to the one or more local audios signals as well as one or more remote signal sources that generate one or more additional electronic signals. The one or more remote signal sources can include one or more audio signal transmitters, one or more broadcast devices, one or more sound systems, or a combination thereof. In this embodiment, the first ear microphone 112 detects a first combination of audio signals including ambient sound and propagated audio signals, corresponding to the one or more electronic signals and the one or more additional electronic signals, received at a first ear of a listener. In this embodiment, the second ear microphone 122 detects a second combination of audio signals including ambient sound and propagated audio signals, corresponding to the one or more electronic signals and the one or more additional electronic signals, received at a second ear of the listener that is different than the first ear.

In this at least one embodiment, the processing device 150 applies a first set of audio filters (e.g., $W_{m,R}$) to generate the first output signal 340A to the first ear playback device 116. The first set of audio filters can include at least a first audio filter (e.g., $W_{1,R}$) to process a respective electronic signal of the one or more electronic signals with a first error signal, which is based on an output of the first ear microphone 112. At least a second audio filter (e.g., $W_{2,R}$) is included to process a respective electronic signal of the one or more additional electronic signals with one of the first error signal (for a MIBO audio filter) or a second error signal (for a set of SIBO audio filters), respectively, based on the output of the first ear microphone. In some embodiments, acoustic cue components of the first output signal match corresponding acoustic cue components of the first combination of audio signals.

In at least this embodiment, the processing device applies a second set of audio filters (e.g., $W_{m,R}$) to generate the second output signal 340B to the second ear playback device 126. The second set of filters can include at least a third audio filter (e.g., $W_{1,L}$) to process a respective electronic signal of the one or more electronic signals with a third error signal, which is based on an output of the second ear microphone 122. At least a fourth audio filter (e.g., $W_{2,R}$) is included to process a respective electronic signal of the one or more additional electronic signals with one of the third error signal (for a MIBO audio filter) or a fourth error signal (for a SIBO audio filter) based on the output of the second ear microphone 122. In some embodiments, acoustic cue components of the second output signal 340B match corresponding acoustic cue components of the second combination of audio signals.

With additional reference to FIGS. 3A-3B, the frequency-domain analysis assumes that the audio filters can be non-causal and can have infinite length. In a real listening system, the audio filters are causal and have finite length. Fortunately, because the remote microphones are placed near the talkers, the binaural filters should closely resemble the acoustic impulse responses between the talkers and listener. As long as the group delay of the desired responses ($g_n$) plus any transmission delay between the remote microphones (or other remote signal sources 102) and the first and second ear microphones 112 and 122 is smaller than the acoustic time of flight between talkers and listener, it should be possible to design causal binaural filters.

The above analysis of also assumes that the acoustic listening system 100 (or devices) is stationary. In reality, human talkers and listeners move constantly. To adapt to changing conditions, the SIBO and MIBO audio filters can be designed to be time-varying. Let $w_m[\tau; t] \in \mathbb{R}^2$ be the filter coefficients at time t for m=1, ..., M and $\tau$=0, ..., L−1, where L is the length of each filter. The filter output is given by $$y[t] = \sum_{m=1}^{M} \sum_{\tau=0}^{L-1} w_m[\tau; t] x_{r,m}[t - \tau]. \qquad (14)$$

In some embodiments, Equation (14) can be written as a matrix-vector multiplication, $$y[t] = \overline{w}[t]\overline{x}_r[t], \qquad (15)$$

where $\overline{x}_r^T[t]=[x_r^T[t], x_r^T[t-1], \ldots, x_r^T[t-L+1]]$ and $\overline{w} \in \mathbb{R}^{2 \times LM}$.

In the experiments in this work, we update the filter coefficients with the least mean squares (LMS) algorithm. The MIBO update is given by $$\overline{w}[t+1] \leftarrow \overline{w}[t] + \mu((g^* x_e)[t] - y[t])\overline{x}_r^T[t], \qquad (16)$$

where $\mu$ is a tunable step size parameter.

The SIBO updates have the same form except that each audio filter is adapted independently:

$$\overline{w}[t+1] \leftarrow \overline{w}[t] + \mu((g_m^* x_e)[t] - \overline{w}_m[t])\overline{x}_{r,m}^T[t]. \qquad (17)$$

With additional reference to FIG. 1, other possible remote signal sources 102 are envisioned, alone or as combined with other remote signal sources, capable of generating electronic signals that represent sound that is also being passed as propagated audio signals through the air. In some embodiments, the remote source signals could be any low-noise mixture of the talkers of interest. For example, the output of a source separation or enhancement algorithm (such as independent vector analysis or a deep neural network) could be connected to the input of the MIBO audio filter 350B. The advantage of the proposed approach is that the input to the adaptive filters can be any combination of the sources of interest. Thus, a source separation algorithm could be useful even if it suffers from a permutation ambiguity, that is, if there is crosstalk in its output.

As another example, the outputs of a set of beamformers, such as those used in many commercial teleconferencing audio capture systems, could be used as inputs to the MIBO audio filter 350B. The adaptive filter would add utility to the listening system 100 by restoring spatial cues and compensating for any spectral distortion caused by the beamformer. Furthermore, talkers would be able to move between the beams and the MIBO audio filter 350B would continue to produce the correct spatial cues without extensive adaptation, as the MIBO audio filter 350B adapts based on the beams from beamformer microphones, not the talker positions.

The listening system 100, which employs the disclosed adaptive filtering, was evaluated experimentally using a binaural dummy head in an acoustically treated laboratory ($T_{60} \approx 250$ ms). Speech signals were either produced by a human talker or derived from the VCTK dataset and played back over loudspeakers. Each talker was recorded separately and the recordings were mixed to simulate simultaneous speech. For each experiment, the adaptive filter coefficients were computed based on the mixture but applied separately to each source recording in order to track the effect of the system on each component signal. The filters were about 20 ms in length and were designed to be transparent for the source(s) of interest ($g_n[t]=\delta[t]$). The step size p was tuned manually. For each experiment, the wideband signal-to-noise ratio (SNR) was computed after high-pass filtering at 200 Hz to exclude mechanical noise in the laboratory. The apparent interaural time delays (ITD) were computed by finding the peak of the cross-correlation within overlapping 5 second windows.

Figure 4B:
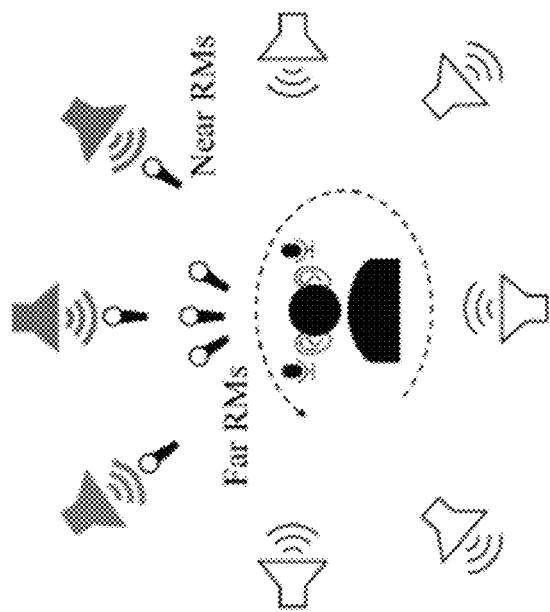
FIG. 4B is a block diagram of the experimental setup with three loudspeaker signal sources and a moving listener according to an embodiment.
Figure 4A:
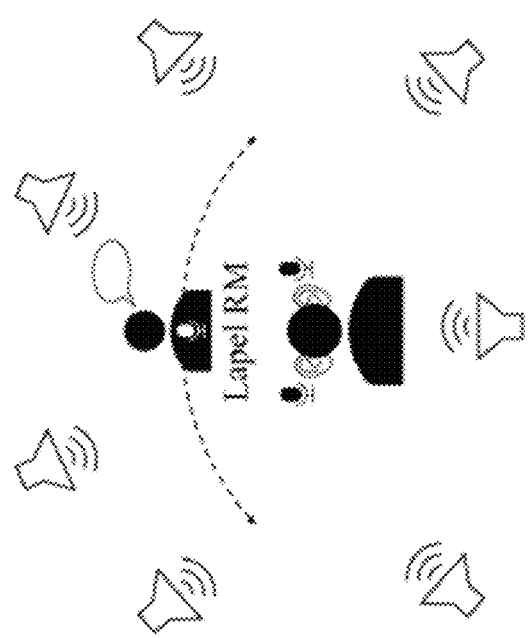
FIG. 4A is a block diagram of an experimental setup with a moving human talker with multiple signal sources and a non-moving listener according to an embodiment.

The experiments are summarized in FIGS. 4A-4B and Table 1. FIG. 4A is a block diagram of an experimental setup with a moving human talker with multiple signal sources and a non-moving listener according to an embodiment. FIG. 4B is a block diagram of the experimental setup with three loudspeaker signal sources and a moving listener according to an embodiment. Table 1 illustrates wideband SNR in decibels for acoustic experiments. Input and filter output SNRs are measured at the left ear for experimental purposes.

TABLE 1

| Sources | Listener | RMs | Input | Remote | MIBO | SIBO |
|---|---|---|---|---|---|---|
| 1 moving | Still | Lapel | −4.3 | 9.3 | — | 7.2 |
| 3 still | Moving | Near | 0.8 | 21.3 | 18.8 | 18.2 |
| 3 still | Moving | Far | 0.7 | 12.0 | 9.8 | 11.7 |

Figure 5:
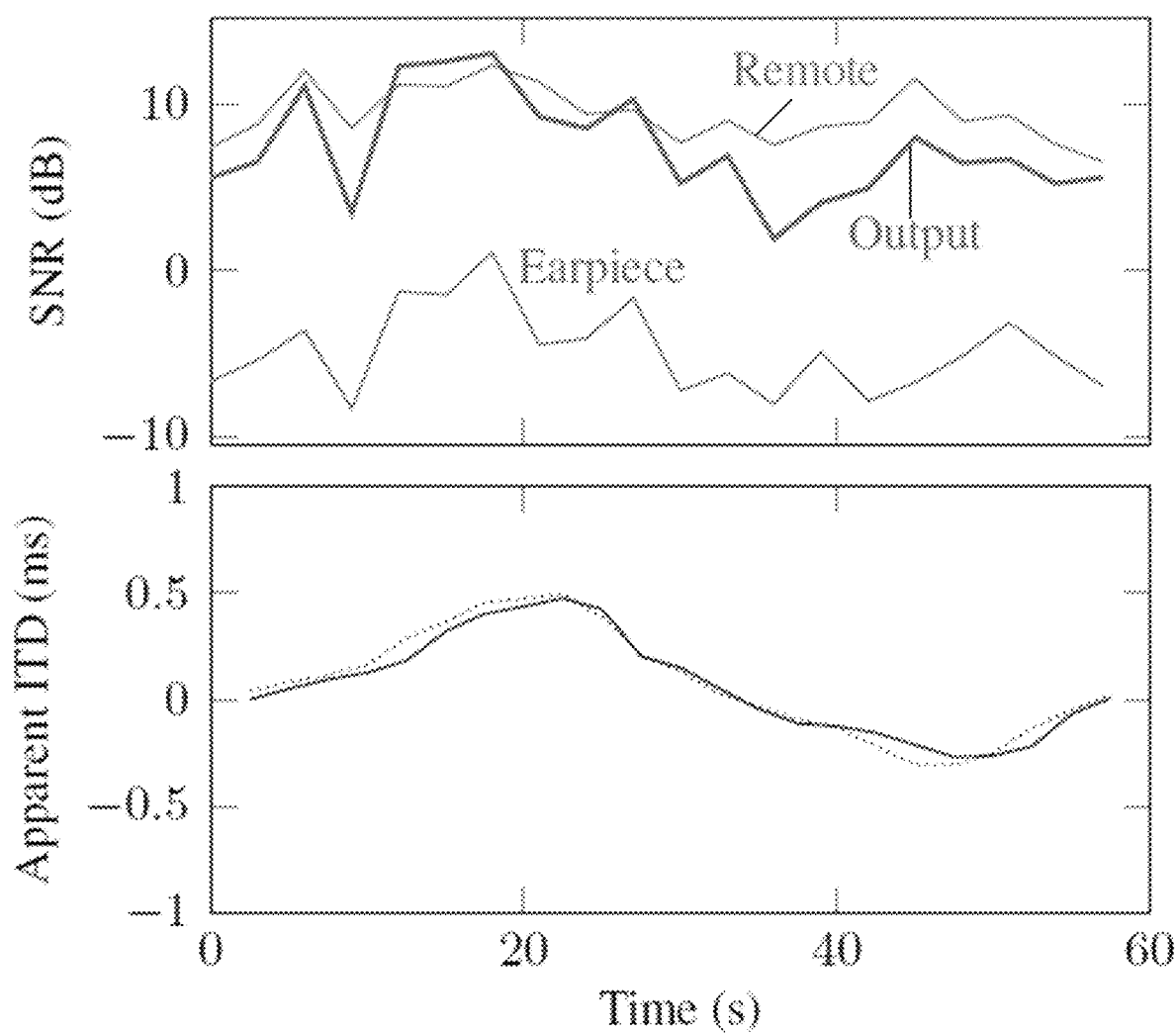
FIG. 5 is a set of graphs illustrating filter performance for a single moving talker according to an embodiment.

FIG. 5 is a set of graphs illustrating filter performance for a single moving talker according to an embodiment. The top graph illustrates SNR at the left ear. The bottom graph illustrates apparent ITD of the target source in the filter output. The dotted curve shows the true ITD. In the first experiment, which simulates the typical use case for remote microphone systems today, a lapel microphone was worn by a moving human talker. Noise was produced by seven loudspeakers placed around the room. The human subject followed the same route during each source recording so that sound and motion are roughly synchronized. The top plot of FIG. 5 shows the wideband input and output SNR at the left ear and the input SNR at the remote microphone. The SNR varied as the talker moved among the interfering loudspeakers. The output SNR closely tracks the remote microphone input SNR, as expected. The bottom plot shows the apparent ITD of the target speech at the output of the binaural filter compared to that of the clean signal at the ears. The adaptive filter is able to track the spatial cues as the talker moves from center to left to right and back again. Thus, the filter output matches the SNR of the remote microphone and the spatial cues of the earpieces.

FIGS. 6A-6D is a set of graphs illustrating apparent interaural time delays (ITDs) from either near signal sources or far signal sources varied between the filters of FIG. 4A and FIG. 4B according to various embodiments. A second experiment simulated a multiple-talker application with a moving listener. The dummy head was placed on a motorized turntable, which made one rotation during the one minute recording, starting from the FIG. 4B scenario. Loudspeakers simulated three talkers of interest and five unwanted speech sources. The remote microphones were three end-address cardioid vocal microphones. First, to simulate personal remote microphones, each remote microphone was placed about 30 cm in front of its corresponding speaker. Second, to simulate an array, the three remote microphones were grouped together about 60 cm from the talkers.

Figure 6A:
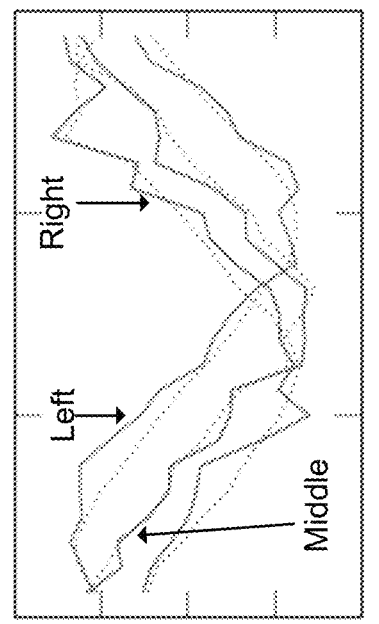
FIGS. 6A-6D is a set of graphs illustrating apparent interaural time delays (ITDs) from either near signal sources or far signal sources varied between the filters of FIG. 4A and FIG. 4B according to various embodiments.
Figure 6B:
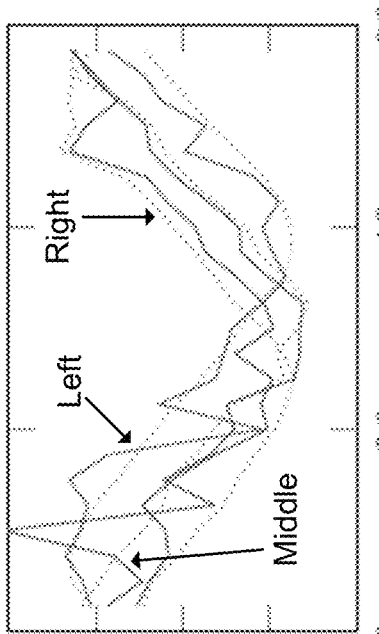
Figure 6C:
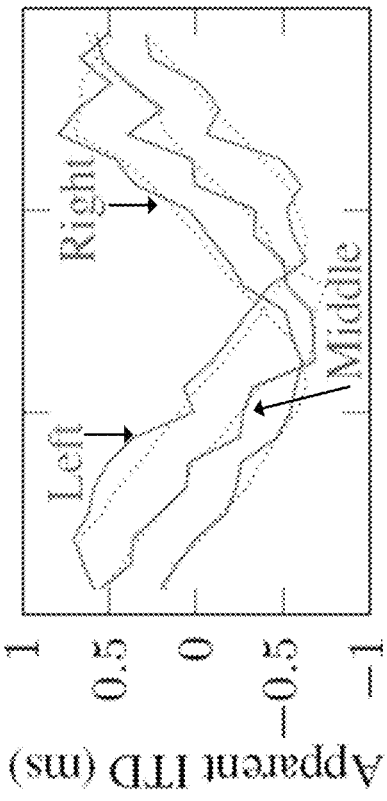
Figure 6D:
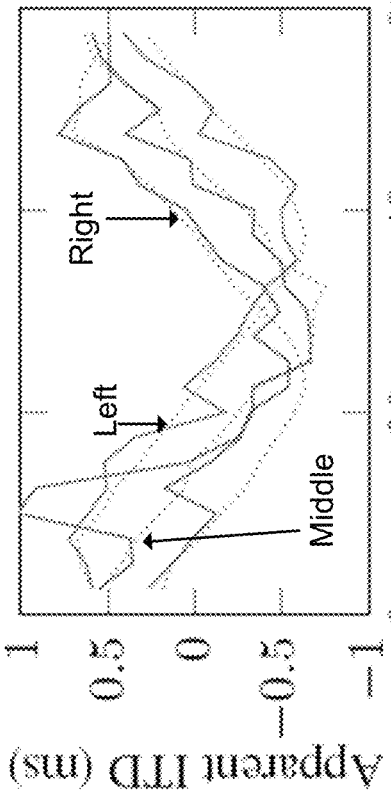

The SNR results are shown in Table 1 and the apparent ITDs are shown in FIGS. 6A-6B for the four combinations of filter type and microphone placement. When the RMs were close to the talkers, the SIBO filters and MIBO filter both performed well, with the MIBO filter achieving a slightly higher SNR and better preserving interaural cues. When the remote microphones were farther from the talkers, the MIBO filter still preserved interaural cues but also reproduced more unwanted noise. The SIBO filters were better at rejecting noise, but crosstalk between sources caused distortion of the interaural cues.

Figure 7:
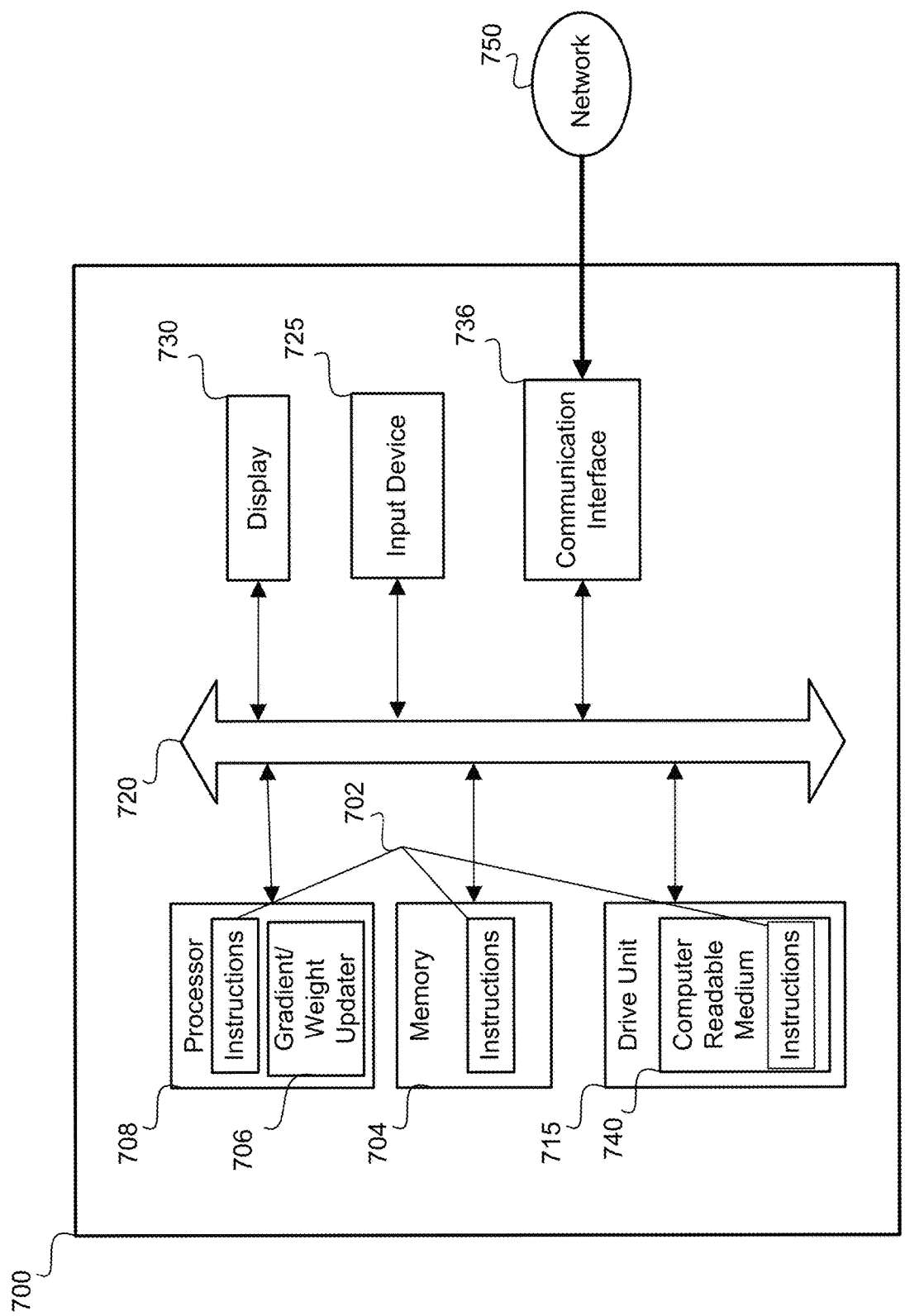
FIG. 7 is a block diagram of an example computer system in which embodiments of the present disclosure can operate.

FIG. 7 is a block diagram of an example computer system 700 in which embodiments of the present disclosure can operate. The system 700 may represent the mobile device 140 or another device or system to which is referred or which is capable of executing the embodiment as disclosed herein. The computer system 700 may include an ordered listing of a set of instructions 702 that may be executed to cause the computer system 700 to perform any one or more of the methods or computer-based functions disclosed herein. The computer system 700 may operate as a stand-alone device or may be connected to other computer systems or peripheral devices, e.g., by using a network 750.

In a networked deployment, the computer system 700 may operate in the capacity of a server or as a client-user computer in a server-client user network environment, or as a peer computer system in a peer-to-peer (or distributed) network environment. The computer system 700 may also be implemented as or incorporated into various devices, such as a personal computer or a mobile computing device capable of executing a set of instructions 702 that specify actions to be taken by that machine, including and not limited to, accessing the internet or web through any form of browser. Further, each of the systems described may include any collection of sub-systems that individually or jointly execute a set, or multiple sets, of instructions to perform one or more computer functions.

The computer system 700 may include a memory 704 on a bus 720 for communicating information. Code operable to cause the computer system to perform any of the acts or operations described herein may be stored in the memory 704. The memory 704 may be a random-access memory, read-only memory, programmable memory, hard disk drive, solid-state disk drive, or other type of volatile or non-volatile memory or storage device.

The computer system 700 may include a processor 708, such as a central processing unit (CPU) and/or a graphics processing unit (GPU). The processor 708 may include one or more general processors, digital signal processors, application specific integrated circuits, field programmable gate arrays, digital circuits, optical circuits, analog circuits, combinations thereof, or other now known or later-developed devices for analyzing and processing data. The processor 708 may implement the set of instructions 702 or other software program, such as manually-programmed or computer-generated code for implementing logical functions. The logical function or system element described may, among other functions, process and/or convert an analog data source such as an analog electrical, audio, or video signal, or a combination thereof, to a digital data source for audio-visual purposes or other digital processing purposes such as for compatibility for computer processing.

The computer system 700 may also include a disk (or optical) drive unit 715. The disk drive unit 715 may include a non-transitory computer-readable medium 740 in which one or more sets of instructions 702, e.g., software, can be embedded. Further, the instructions 702 may perform one or more of the operations as described herein. The instructions 702 may reside completely, or at least partially, within the memory 704 and/or within the processor 708 during execution by the computer system 700. Accordingly, the databases displayed and described above with reference to FIGS. 2A and 2B may be stored in the memory 704 and/or the disk unit 715.

The memory 704 and the processor 708 also may include non-transitory computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electro-magnetic, infrared, or semiconductor system, apparatus, device, or propagation medium.

Additionally, the computer system 700 may include an input device 725, such as a keyboard or mouse, configured for a user to interact with any of the components of system 700. It may further include a display 730, such as a liquid crystal display (LCD), a cathode ray tube (CRT), or any other display suitable for conveying information. The display 730 may act as an interface for the user to see the functioning of the processor 708, or specifically as an interface with the software stored in the memory 704 or the drive unit 715.

The computer system 700 may include a communication interface 736 that enables communications via the communications network 710. The network 710 may include wired networks, wireless networks, or combinations thereof. The communication interface 736 network may enable communications via a number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. A computer system or other apparatus adapted for carrying out the methods described herein is suited to the present disclosure. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, SD-cards, solid-state drives, or any type of media suitable for storing electronic instructions, each coupled to a computer system bus.

The algorithms, operations, and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, solid-state memory components, etc.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not intended to mean the same implementation or implementation unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A listening system comprising:
   one or more remote signal sources that generate one or more electronic signals, which correspond to sound in an ambient environment;
   a first ear microphone to detect a first combination of audio signals comprising ambient sound and one or more propagated audio signals, corresponding to the one or more electronic signals, received at a first ear of a listener;
   a first ear playback device; and
   a processing device coupled to the one or more remote signal sources, to the first ear microphone, and to the first ear playback device, the processing device to apply a first set of audio filters comprising an audio filter to process a respective electronic signal of the one or more electronic signals with a first error signal, which is based on an output of the first ear microphone, to generate a first output signal to the first ear playback device, wherein acoustic cue components of the first output signal match corresponding acoustic cue components of the first combination of audio signals.

2. The listening system of claim 1, wherein the one or more remote signal sources comprises one or more microphones, an array of microphones, one or more audio signal transmitters, one or more broadcast devices, one or more sound systems, or a combination thereof.

3. The listening system of claim 1, further comprising:
   a second ear microphone to detect a second combination of audio signals comprising ambient sound and one or more propagated audio signals, corresponding to the one or more electronic signals, received at a second ear of the listener that is different than the first ear;
   a second ear playback device; and
   wherein the processing device is further coupled to the second ear microphone and to the second ear playback device and is further to apply a second set of audio filters comprising an audio filter to process a respective electronic signal of the one or more electronic signals with a second error signal, which is based on an output of the second ear microphone, to generate a second output signal to the second ear playback device, wherein acoustic cue components of the second output signal match corresponding acoustic cue components of the second combination of audio signals.

4. The listening system of claim 3, further comprising:
   a first hearing device containing the first ear microphone and connected to the first ear playback device; and
   a second hearing device containing the second ear microphone and connected to the second ear playback device, and wherein the processing device is located within one of the first hearing device, the second hearing device, or a mobile device communicatively coupled to the first hearing device and the second hearing device.

5. The listening system of claim 3, wherein the first set of audio filters and the second set of audio filters are defined by a parametric model that is to separately, for each of the remote signal sources, at least one of:
   apply an equalization filter that is shared by both the first output signal and the second output signal; or
   encode interaural time and amplitude level differences between the first output signal and the second output signal.

6. The listening system of claim 1, wherein the first set of audio filters is defined by a parametric model, wherein the first set of audio filters is to separately, for each of the remote signal sources, at least one of:
   encode a delay time for the first output signal;
   perform parametric equalization for the first output signal;
   encode a set of effects of ambient acoustics on a spectrum of the one or more electronic signals;
   define a filter that has an impulse response of a particular length; or
   define a filter described by a set of poles and zeros.

7. The listening system of claim 1, wherein the one or more electronic signals comprise a plurality of electronic signals, each audio filter of the first set of audio filters is to generate an intermediate output signal corresponding to a respective electronic signal, and wherein the processing device is further to combine the intermediate output signals to generate the first output signal.

8. The listening system of claim 7, wherein the processing device is further to:
   process the output of the first ear microphone to generate a processed microphone signal; and
   mix, into the first output signal, the processed microphone signal.

9. The listening system of claim 7, wherein, to generate the first output signal, the processing device is further to process the combination of the intermediate output signals with post-processing that corresponds to an audio parameter.

10. The listening system of claim 9, further comprising a user interface coupled to the processing device, wherein the processing device is further to:
    receive, via the user interface, a menu selection to adjust the audio parameter; and adjust the audio parameter of the post-processing according to the menu selection.

11. The listening system of claim 7, wherein the first error signal comprises a difference between a combination of the intermediate output signals and the output of the first ear microphone, and wherein a single acoustic loss function of the first set of audio filters is to adaptively minimize a mean-square value or other function of the first error signal.

12. The listening system of claim 1, wherein the audio filter comprises a first audio filter, and the first error signal comprises a difference between an output of the first audio filter and the output of the first ear microphone, and wherein the processing device is further to:
input a first electronic audio signal, from a first remote signal source, to the first audio filter;
cause the first audio filter to adaptively minimize a mean-square value or other function of the first error signal in a first intermediate output signal;
input a second electronic signal, from a second remote signal source, to a second audio filter of the first set of audio filters, wherein a second error signal comprises a difference between an output of the second audio filter and the output of the first ear microphone;
cause the second audio filter to minimize a mean-square value or other function of the second error signal in a second intermediate output signal; and
combine, to generate the first output signal, the first intermediate output signal with the second intermediate output signal.

13. The listening system of claim 12, wherein the processing device is further to:
apply a first processing variation to the first intermediate output signal; and
apply a second processing variation to the second intermediate output signal.

14. The listening system of claim 12, further comprising:
a first audio detector coupled to the processing device, wherein the processing device is further to disable the first audio filter in response to sound from the first remote signal source not satisfying a threshold magnitude; and
a second audio detector coupled to the processing device, wherein the processing device is further to disable the second audio filter in response to sound from the second remote signal source not satisfying the threshold magnitude.

15. A listening device comprising:
an ear microphone to detect a combination of audio signals comprising ambient sound and one or more propagated audio signals, corresponding to one or more electronic signals, received at an ear of a listener from one or more remote signal sources;
an ear playback device; and
a processing device coupled to the one or more remote signal sources, to the ear microphone, and to the ear playback device, the processing device to apply a set of audio filters comprising an audio filter to process a respective electronic signal of the one or more electronic signals with an error signal, which is based on an output of the ear microphone, to generate an output signal to the ear playback device, wherein acoustic cue components of the output signal match corresponding acoustic cue components of the combination of audio signals.

16. The listening device of claim 15, wherein the set of audio filters is defined by a parametric model, wherein the set of audio filters is to separately, for each of the remote signal sources, at least one of:
encode a delay time for the output signal;
perform parametric equalization for the output signal;
encode a set of effects of ambient acoustics on a spectrum of the one or more electronic signals;
define a filter that has an impulse response of a particular length; or
define a filter described by a set of poles and zeros.

17. The listening device of claim 15, wherein the one or more electronic signals comprise a plurality of electronic signals, each audio filter of the set of audio filters is to generate an intermediate output signal corresponding to a respective electronic signal, and wherein the processing device is further to combine the intermediate output signals to generate the output signal.

18. The listening device of claim 17, wherein the processing device is further to:
process the output of the ear microphone to generate a processed microphone signal; and
mix, into the output signal, the processed microphone signal.

19. The listening device of claim 17, wherein, to generate the output signal, the processing device is further to process the combination of the intermediate output signals with post-processing that corresponds to an audio parameter.

20. The listening device of claim 17, wherein the error signal comprises a difference between a combination of the intermediate output signals and the output of the ear microphone, and wherein a single acoustic loss function of the set of audio filters is to adaptively minimize a mean-square value or other function of the error signal.

21. The listening device of claim 15, wherein the audio filter comprises a first audio filter, and the error signal comprises a difference between an output of the first audio filter and the output of the ear microphone, and wherein the processing device is further to:
input a first electronic audio signal, from a first remote signal source, to the first audio filter;
cause the first audio filter to adaptively minimize a mean-square value or other function of the error signal in a first intermediate output signal;
input a second electronic signal, from a second remote signal source, to a second audio filter of the set of audio filters, wherein a second error signal comprises a difference between an output of the second audio filter and the output of the ear microphone;
cause the second audio filter to minimize a mean-square value or other function of the second error signal in a second intermediate output signal; and
combine, to generate the output signal, the first intermediate output signal with the second intermediate output signal.

22. The listening device of claim 21, wherein the processing device is further to:
apply a first processing variation to the first intermediate output signal; and
apply a second processing variation to the second intermediate output signal.

23. The listening device of claim 21, further comprising:
a first audio detector coupled to the processing device and to the first audio filter, wherein the processing device is further to disable the first audio filter in response to sound from the first remote signal source not satisfying a threshold magnitude; and
a second audio detector coupled to the processing device and to the second audio filter, wherein the processing device is further to disable the second audio filter in response to sound from the second remote signal source not satisfying the threshold magnitude.

24. A listening system comprising:
   a first ear microphone to detect a first combination of audio signals received at a first ear of a listener, the first combination of audio signal comprising ambient sound and a plurality of propagated audio signals, corresponding to one or more electronic signals received from one or more remote microphones and one or more additional electronic signals received from one or more remote signal sources;
   a first ear playback device; and
   a processing device communicatively coupled to the one or more remote signal sources, to the first ear microphone, and to the first ear playback device, the processing device to apply a first set of audio filters to generate a first output signal to the first ear playback device, the first set of audio filters comprising:
      at least a first audio filter to process a respective electronic signal of the one or more electronic signals with a first error signal, which is based on an output of the first ear microphone; and
      at least a second audio filter to process a respective electronic signal of the one or more additional electronic signals with one of the first error signal or a second error signal based on the output of the first ear microphone; and
      wherein acoustic cue components of the first output signal match corresponding acoustic cue components of the first combination of audio signals.

25. The listening system of claim 24, further comprising the one or more remote signal sources, which comprise one or more audio signal transmitters, one or more broadcast devices, one or more sound systems, or a combination thereof.

26. The listening system of claim 24, further comprising:
   a second ear microphone to detect a second combination of audio signals comprising ambient sound and a plurality of propagated audio signals, corresponding to the one or more electronic signals and the one or more additional electronic signals, received at a second ear of the listener that is different than the first ear;
   a second ear playback device; and
   wherein the processing device is further coupled to the second ear microphone and to the second ear playback device and is further to apply a second set of audio filters to generate a second output signal to the second ear playback device, the second set of filters comprising:
      at least a third audio filter to process a respective electronic signal of the one or more electronic signals with a third error signal, which is based on an output of the second ear microphone; and
      at least a fourth audio filter to process a respective electronic signal of the one or more additional electronic signals with one of the third error signal or a fourth error signal based on the output of the second ear microphone; and
      wherein acoustic cue components of the second output signal match corresponding acoustic cue components of the second combination of audio signals.

* * * * *